: US011991426B2

United States Patent
Zhang et al.

(10) Patent No.: US 11,991,426 B2
(45) Date of Patent: May 21, 2024

(54) PHOTOGRAPHING MODULE AND TERMINAL DEVICE

(71) Applicant: VIVO MOBILE COMMUNICATION CO., LTD., Chang'an Dongguan (CN)

(72) Inventors: Tao Zhang, Chang'an Dongguan (CN); Congjun Xie, Chang'an Dongguan (CN)

(73) Assignee: VIVO MOBILE COMMUNICATION CO., LTD., Chang'an Dongguan (CN)

( * ) Notice: Subject to any disclaimer, the term of this patent is extended or adjusted under 35 U.S.C. 154(b) by 171 days.

(21) Appl. No.: 17/557,189

(22) Filed: Dec. 21, 2021

(65) Prior Publication Data

US 2022/0166904 A1 May 26, 2022

Related U.S. Application Data

(63) Continuation of application No. PCT/CN2020/084931, filed on Apr. 15, 2020.

(30) Foreign Application Priority Data

Jun. 26, 2019 (CN) .......................... 201910559132.0

(51) Int. Cl.
*H04N 23/51* (2023.01)
*G02B 13/18* (2006.01)
(Continued)

(52) U.S. Cl.
CPC .............. *H04N 23/51* (2023.01); *G02B 13/18* (2013.01); *G02F 1/1514* (2019.01); *H04N 23/54* (2023.01);
(Continued)

(58) Field of Classification Search
CPC ........ H04N 23/05; H04N 23/54; H04N 23/55; H04N 23/75; H04N 23/56; H04N 23/57;
(Continued)

(56) References Cited

U.S. PATENT DOCUMENTS

2007/0253703 A1* 11/2007 Tsai ....................... H04N 7/142
348/E5.025
2012/0287333 A1  11/2012 Huang et al.
(Continued)

FOREIGN PATENT DOCUMENTS

CN  104519265 A  4/2015
CN  206212125 U  5/2017
(Continued)

OTHER PUBLICATIONS

Extended European Search Report related to Application No. 20832469.9 reported on Jul. 8, 2022.
(Continued)

*Primary Examiner* — Ahmed A Berhan
(74) *Attorney, Agent, or Firm* — von Briesen & Roper, s.c.

(57) ABSTRACT

A photographing module is provided, including a module housing, and a light sensing chip and a light capturing apparatus that are disposed in a cavity of the module housing, where a first light capturing hole and a second light capturing hole are provided on two opposite sides of the module housing, the light capturing apparatus is disposed opposite to each of the first light capturing hole and the second light capturing hole, in a first photographing state, ambient light passing through the second light capturing hole is projected onto the light sensing chip through the light capturing apparatus, and in a second photographing state, ambient light passing through the first light capturing hole is projected onto the light sensing chip through the light capturing apparatus.

20 Claims, 3 Drawing Sheets

(51) Int. Cl.
*G02F 1/1514* (2019.01)
*H04N 23/54* (2023.01)
*H04N 23/55* (2023.01)
*H04N 23/75* (2023.01)
*H04M 1/02* (2006.01)

(52) U.S. Cl.
CPC .............. *H04N 23/55* (2023.01); *H04N 23/75* (2023.01); *H04M 1/0264* (2013.01)

(58) Field of Classification Search
CPC ...... H04N 23/51; G02B 13/18; G02F 1/1514; H04M 1/0264; H04M 1/0235
See application file for complete search history.

(56) References Cited

U.S. PATENT DOCUMENTS

| | | | | |
|---|---|---|---|---|
| 2014/0055624 | A1* | 2/2014 | Gaines | G02B 5/08 348/207.1 |
| 2015/0062420 | A1* | 3/2015 | Borthakur | H01L 27/14625 348/373 |
| 2016/0241764 | A1 | 8/2016 | Luo et al. | |
| 2018/0188502 | A1* | 7/2018 | Shih | G03B 37/04 |
| 2019/0129205 | A1* | 5/2019 | Wang | G06F 1/1696 |
| 2020/0213491 | A1 | 7/2020 | Huang et al. | |

FOREIGN PATENT DOCUMENTS

| | | |
|---|---|---|
| CN | 108990339 A | 12/2018 |
| CN | 109302555 A | 2/2019 |
| CN | 208691398 U | 4/2019 |
| CN | 208862941 U | 5/2019 |
| CN | 110266848 A | 9/2019 |
| JP | 2001223924 A | 8/2001 |
| JP | 2001249260 A | 9/2001 |
| JP | 2003087613 A | 3/2003 |
| JP | 2012226286 A | 11/2012 |
| WO | 2019015651 A1 | 1/2019 |

OTHER PUBLICATIONS

International search report and written opinion related to Application No. PCT/CN2020/084931 reported on Jun. 28, 2020.
Chinese Search Report related to Application No. 201910559132.0 reported on Apr. 17, 2020.
Japanese Office Action for related Application No. 2021-573369; reported on Nov. 22, 2022.

* cited by examiner

PHOTOGRAPHING MODULE AND TERMINAL DEVICE

CROSS-REFERENCE OF RELATED APPLICATION

This application is a continuation application of International Application No, PCT/CN2020/084931 filed on Apr. 15, 2020, which claims priority to Chinese Patent Application No. 201910559132.0 filed in China on Jun. 26, 2019, which is incorporated herein by reference in its entirety.

TECHNICAL FIELD

The present disclosure relates to the technical field of communication devices, and in particular, to a photographing module and a terminal device.

BACKGROUND

As requirements of users increase, terminal devices have more and more functions. A photographing function is one of basic functions of terminal devices, and more and more terminal devices are equipped with a front-facing camera and a rear-facing camera to satisfy different photographing requirements of users.

To increase the screen-to-body ratio of a terminal device, a front-facing camera in the related technology is usually a camera that can be extended and retracted. When the front-facing camera is required to work, the front-facing camera may extend out of the cavity of the housing of the terminal device, so that the user may take a selfie. When the selfie is taken, the front-facing camera may retract into the cavity from outside the housing, to hide itself in the housing.

Although the front-facing camera that can be extended and retracted does not occupy board space for disposing a display screen on the housing, the front-facing camera still occupies space in the housing. As a terminal device has more and more functions, the housing of the terminal device is integrated with more and more electronic components. Both the front-facing camera and the rear-facing camera need to occupy a space in the housing. Obviously, this makes it difficult to integrate more electronic components in the housing.

SUMMARY

The present disclosure discloses a terminal device.

The present disclosure adopts the following technical solution:

A photographing module includes a module housing, and a light sensing chip and a light capturing apparatus that are disposed in a cavity of the module housing, where a first light capturing hole and a second light capturing hole are provided on two opposite sides of the module housing, the light capturing apparatus is disposed opposite to each of the first light capturing hole and the second light capturing hole, in a first photographing state, ambient light passing through the second light capturing hole is projected onto the light sensing chip through the light capturing apparatus, and in a second photographing state, ambient light passing through the first light capturing hole is projected onto the light sensing chip through the light capturing apparatus.

A terminal device includes a device housing, a driving structure, and the foregoing photographing module, where the driving structure is connected to the photographing module, the device housing is provided with a via hole, and the driving structure drives the photographing module to extend out of the device housing or retract into the device housing through the via hole.

BRIEF DESCRIPTION OF DRAWINGS

The accompanying drawings illustrated herein are provided to further understand the present disclosure and form a part of the present disclosure. The exemplary embodiments of the present disclosure and the descriptions thereof are used to explain the present disclosure and do not constitute an improper limitation on the present disclosure. In the accompanying drawings.

Figure 1:
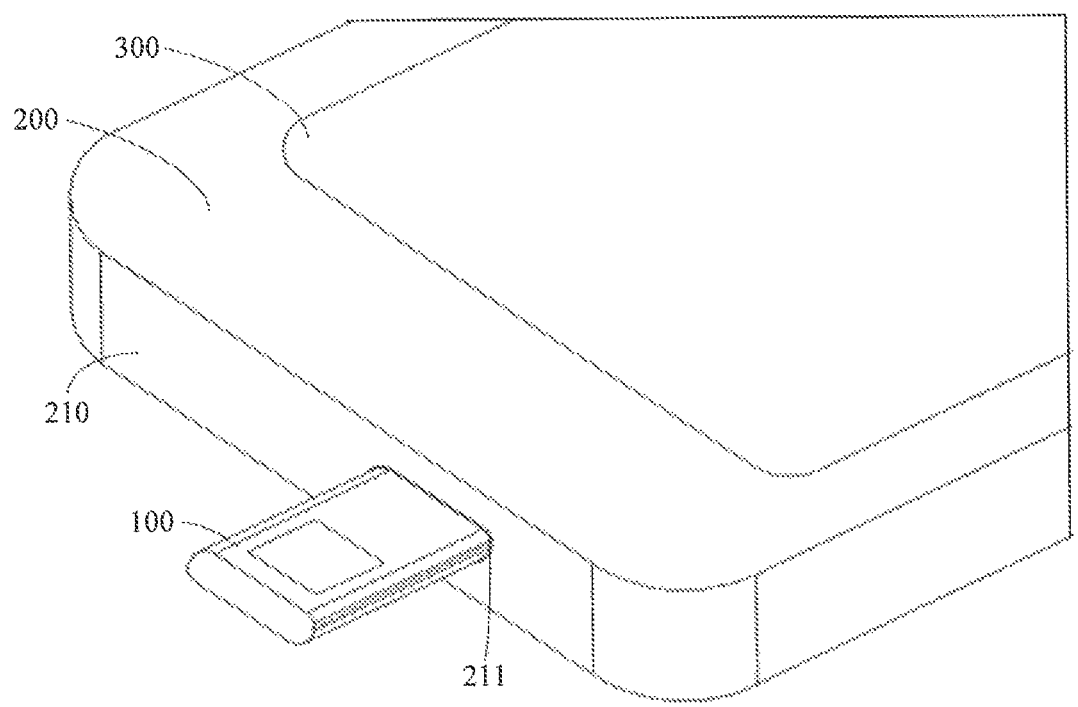
FIG. 1 is a schematic structural diagram of a part of a terminal device according to an embodiment of this disclosure.

Description of Reference Numerals in Accompanying Drawing:

100-photographing module, 110-module housing, 111-first light capturing hole, 112-second light capturing hole, 113-first connection hole, 114-second connection hole, 115-first electrical connection portion, 116-second electrical connection portion, 117-first flexible circuit board, 118-second flexible circuit board, 119-circuit board, 1110-bonding edge, 120-light sensing chip, 130-first light capturing component, 140-second light capturing component, 150-lens component, 160-first electrochromic component, 170-second electrochromic component, 180-light filter, 200-device housing, 210-middle frame, 211-via hole, and 300-display screen.

DETAILED DESCRIPTION OF EMBODIMENTS

To make the objectives, technical solutions, and advantages of the present disclosure clearer, the following clearly and completely describes the technical solutions in the present disclosure with reference to specific embodiments of the present disclosure and the corresponding accompanying drawings. Apparently, the described embodiments are some rather than all of the embodiments of the present disclosure. All other embodiments obtained by a person of ordinary skill in the art based on the embodiments of the present disclosure without creative efforts shall fall within the protection scope of the present disclosure.

The technical solutions disclosed in the embodiments of the present disclosure are described in detail with reference to the accompanying drawings.

Referring to FIG. 1 to FIG. 4, the embodiments of the present disclosure disclose a photographing module 100, and the disclosed photographing module 100 can be applied to a terminal device. The photographing module 100 disclosed in the embodiments of the present disclosure includes a module housing 110, a light sensing chip 120, and a light capturing apparatus.

The module housing 110 is a basic component of the photographing module 100, and the module housing 110 may provide an installation basis for other components of the photographing module 100. In the embodiments of the present disclosure, the light sensing chip 120 and the light capturing apparatus are both disposed in the cavity of the module housing 110, A first light capturing hole 111 and a second light capturing hole 112 are provided on two opposite sides of the module housing 110, and the first light capturing hole 111 and the second light capturing hole 112 may capture light on the two opposite sides of the module housing 100.

The light sensing chip 120 is a light sensing sensor of the photographing module 100. Ambient light is finally projected onto the light sensing chip 120 and then may be sensed, and finally image information may be formed. The light sensing process and principle of the light sensing chip 120 are well-known technologies, and are not repeated herein.

Under normal circumstances, the light sensing surface of the light sensing chip 120 may be covered by a light filter 180, to achieve the effect of light filtering to help improve the light sensing effect of the light sensing chip 120. Specifically, the light filter 180 may be pasted on the light sensing chip 120 through an optical clear adhesive layer.

Figure 4:
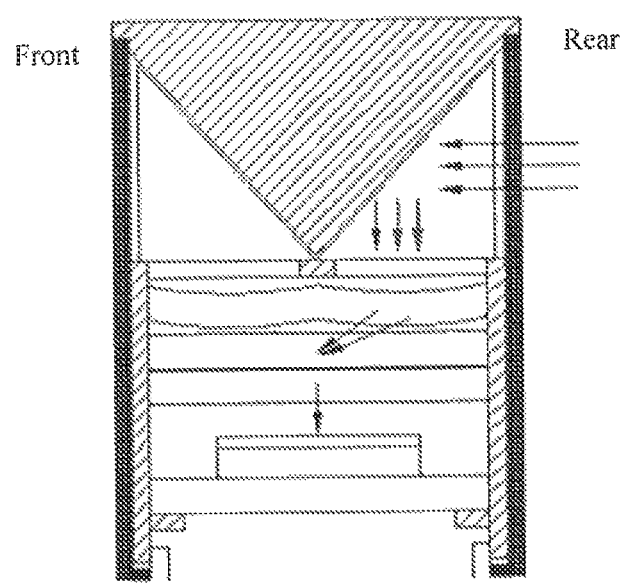
FIG. 4 are schematic diagrams of working of photographing modules according to embodiments of the present disclosure.

The photographing module 100 disclosed in the present disclosure has the first photographing state and the second photographing state. In the first photographing state, ambient light passing through the second light capturing hole 112 passes through the light capturing apparatus and is projected onto the light sensing chip 120, to realize light sensing photographing of the light sensing chip 120. As shown in FIG. 4, in the first photographing state, the photographing module 100 photographs towards the rear side. In this case, the photographing module 100 is equivalent to the rear-Facing camera of the terminal device, to photograph a scene at a long distance for the user. In the first photographing state, ambient light passing through the first light capturing hole 111 cannot be finally sensed by the light sensing chip 120. In this case; the first light capturing hole 111 is usually blocked.

Figure 3:
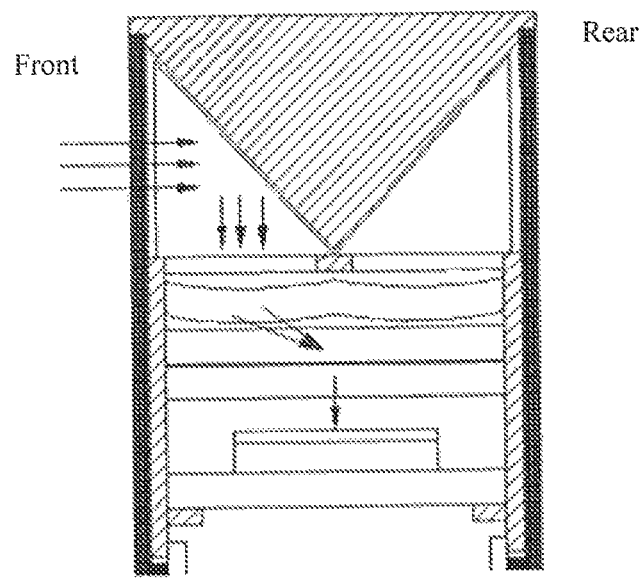

In the second photographing state, ambient light passing through the first light capturing hole 111 passes through the light capturing apparatus and is projected onto the light sensing chip 120, to realize light sensing photographing of the light sensing chip 120. As shown in FIG. 3, for the convenience of description, in the second photographing state, the photographing module 100 photographs towards the front side of the terminal device, that is, a side of the device housing 200 of the terminal device on which the display screen 300 is disposed. In this case, the photographing module 100 is equivalent to the front-facing camera of the terminal device, to take a selfie for the user. In the second photographing state, ambient light passing through the second light capturing hole 112 cannot be finally sensed by the light sensing chip 120. In this case, the second light capturing hole 112 is usually blocked.

As can be seen from the foregoing process, in the photographing module 100 disclosed in the embodiments of the present disclosure, the ambient light sensed by the light sensing chip 120 in the first photographing state and the second photographing state come from different sources. In this case, the light sensing chip 120 of the photographing module 100 can capture or photograph scenes in two opposite directions, that is, the photographing module 100 may be used as both a front-facing camera and a rear-facing camera. Therefore, the terminal device equipped with the photographing module 100 does not need to be configured with a front-facing camera and a rear-facing camera. This can reduce the number of cameras, and in turn can reduce space occupied in the terminal device.

The light capturing apparatus may adjust the direction of the ambient light of the first light capturing hole 111 and the second light capturing hole 112, so that the ambient light may finally be projected onto the light sensing chip 120. The light capturing apparatus may have multiple structures, for example, the light capturing apparatus includes two different reflecting surfaces.

In an optional solution, the light capturing apparatus may include a first light capturing component 130 and a second light capturing component 140. The first light capturing hole 111 and the second light capturing hole 112 are disposed opposite to the first light capturing component 130 and the second light capturing component 140 respectively. The first light capturing component 130 may distribute ambient light passing through the first light capturing hole 111, so that the ambient light is projected onto the light sensing chip 120 after being distributed by the first light capturing component 130. Similarly, the second light capturing component 140 may distribute ambient light passing through the second light capturing hole 112, so that the ambient light is projected onto the light sensing chip 120 after being distributed by the second light capturing component 140.

In the first photographing state, the ambient light passing through the second light capturing hole 112 is projected onto the light sensing chip 120 through the second light capturing component 140, and in the second photographing state, the ambient light passing through the first light capturing hole 111 is projected onto the light sensing chip 120 through the first light capturing component 130.

Figure 2:
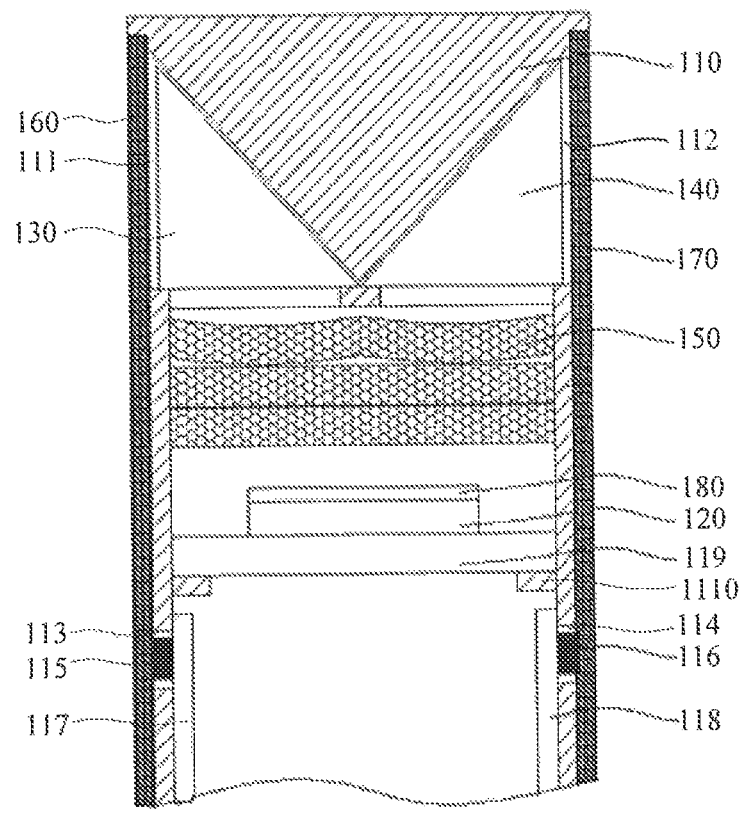
FIG. 2 is a cutaway view of a photographing module according to an embodiment of the present disclosure; and FIG.

As described above, the first light capturing component 130 and the second light capturing component 140 may distribute the ambient light to adjust the direction of the ambient light. As shown in FIG. 2, in a specific implementation, both the first light capturing component 130 and the second light capturing component 140 may be reflecting prisms. Certainly, the first light capturing component 130 and the second light capturing component 140 may also be plane mirrors. The embodiments of the present disclosure do not limit specific types of the first light capturing component 130 and the second light capturing component 140.

To better implement light distribution, the photographing module 100 disclosed in the embodiments of the present disclosure may further include a lens component 150, where the lens component 150 may be disposed in the cavity of the module housing 110, and the ambient light passing through the light capturing apparatus passes through the lens component 150 and is projected onto the light sensing chip 120. In other words, the lens component 150 may further redistribute the ambient light that passes through the light capturing apparatus, so that a light path may be adjusted more flexibly, which helps the light sensing chip 120 better sense light, Specifically, the lens component 150 usually includes at least one lens. As shown in FIG. 2, the lens component 150 includes three stacked lenses. The embodiments of the present disclosure do not limit the number of lenses included in the lens component 150.

Specifically, whether the first light capturing hole 111 and the second light capturing hole 112 transmit light is controlled, so that the photographing module 100 switches between the first photographing state and the second photographing state. Whether the first light capturing hole 111 and the second light capturing hole 112 transmit light is controlled in many ways. For example, in a simpler implementation, the photographing module may include a light shielding sheet that may be detachably disposed on the first light capturing hole 111 or the second light capturing hole 112. When the first light capturing hole 111 is required to capture light, the light shielding sheet is removed and then disposed on the second light capturing hole 112. When the second light capturing hole 112 is required to capture the light shielding sheet is removed and disposed on the first light capturing hole 111.

Certainly, the module housing 110 may be equipped with two shading sheets, both of which may rotate. The two shading sheets correspond to the first light capturing hole 111 and the second light capturing hole 112 respectively, and the two shading sheets both may rotate to switch between a blocking position and an avoiding position, to control light capturing of the first light capturing hole 111 and the second light capturing hole 112.

The above methods usually require manual manipulation by the user, which is inconvenient for the user to manipulate. On this basis, referring to FIG. 2 again, in an optional solution, the photographing module 100 disclosed in the embodiments of the present disclosure may further include a first electrochromic component 160, a second electrochromic component 170, and a controller, where the controller may be a control chip integrated on the motherboard of the terminal device.

The first electrochromic component 160 and the second electrochromic component 170 are both disposed on the module housing 110, and the first electrochromic component 160 and the second electrochromic component 170 are both made of electrochromic materials. When power-on currents are different, the first electrochromic component 160 and the second electrochromic component 170 change colors, which affects passage of light, to switch between a light-transmitting state and a light-blocking state.

The first electrochromic component 160 covers the first light capturing hole 111, the second electrochromic component 170 covers the second light capturing hole 112, the controller is connected to the first electrochromic component 160 and the second electrochromic component 170, and the controller controls currents of the first electrochromic component 160 and the second electrochromic component 170 to control the first electrochromic component 160 and the second electrochromic component 170 to transmit light or block light. In this case, the user may control the terminal device and control currents of the first electrochromic component 160 and the second electrochromic component 170, to control switching between the first photographing state and the second photographing state.

There are many types of electrochromic materials. In an optional solution, both the first electrochromic component 160 and the second electrochromic component 170 may be electrochromic glass plates. The electrochromic glass plate may also serve as a cover plate of the photographing module, which can desirably serve decorative purpose.

In an optional solution, the module housing 110 includes a first surface and a second surface that are distributed opposite to each other, the first light capturing hole 111 may be provided on the first surface, and the first electrochromic component 160 may cover the first surface, so that the photographing module 100 may have better aesthetics performance on this side. Similarly, the second light capturing hole 112 may be provided on the second surface, and the second electrochromic component 170 may cover the second surface. Similarly, this disposing method can improve aesthetic performance of the photographing module. Specifically, the first electrochromic component 160 and the module housing 110 may be fixedly bonded, and similarly, the second electrochromic component 170 and the module housing 110 may be fixedly bonded.

Both the first electrochromic component 160 and the second electrochromic component 170 need to be powered on during operation. Normally, the photographing module 100 is electrically connected to the circuit board (such as the =inboard of the terminal device) in the device housing 200, to supply power to the first electrochromic component 160 and the second electrochromic component 170.

Electrical connection of the first electrochromic component 160 and the second electrochromic component 170 is implemented in many structures. The first surface may be provided with a first connection hole 113 connected to the inside of the module housing 110, and the second surface may be provided with a second connection hole 114 connected to the inside of the module housing 110. The first connection hole 113 is provided with a first electrical connection portion 115, the second connection hole 114 is provided with a second electrical connection portion 116, the first electrical connection portion 115 is electrically connected to the first electrochromic component 160, and the second electrical connection portion 116 is electrically connected to the second electrochromic component 170, Normally, the photographing module 100 is a scalable structure and needs to move relative to the device housing 200 of the terminal device. To better adapt to the position of the photographing module 100, the first electrical connection portion 115 and the second electrical connection portion 116 may be electrically connected to a circuit board (such as the mainboard of the terminal device) in the device housing 200 of the terminal device through a flexible electrical connection component passing through the module housing 110.

To facilitate assembly, in an optional solution, both the first electrical connection portion 115 and the second electrical connection portion 116 may be silver paste portions. During a preparation process, silver paste may be solidified on the first electrochromic component 160 and the second electrochromic component 170, so that the first electrical connection portion 115 and the second electrical connection portion 116 are respectively formed. During a disposing process, the first electrical connection portion 115 is aligned with the first connection hole 113 to dispose the first electrochromic component 160 on the module housing 110, Similarly, the second electrical connection portion 116 is aligned with the second connection hole 114 to dispose the second electrochromic component 170 on the module housing 110, The above connection method undoubtedly facilitates an electrical connection operation.

In an optional solution, the flexible electrical connection component may include a first flexible circuit board 117 and a second flexible circuit board 118, One end of the first flexible circuit board 117 may be electrically connected to the first electrical connection portion 115, and the other end of the first flexible circuit board 117 may pass through the module housing 110 and is electrically connected to the circuit board in the device housing 200, Similarly, one end of the second flexible circuit board 118 may be electrically connected to the second electrical connection portion 116, and the other end of the second flexible circuit board 118 may pass through the module housing 110 and is electrically connected to the circuit board in the device housing 200. This method of supplying power to the first electrochromic component 160 and the second electrochromic component 170 through electrical connection components can avoid electrical connection impact between each other, which is convenient for maintenance and an electrical connection operation.

Specifically, the first flexible circuit board 117 may be attached to a first inner wall of the module housing 110 and cover the first electrical connection portion 115. The second flexible circuit board 118 may be attached to a second inner wall of the module housing 110 and cover the second electrical connection portion 116, The first inner wall and the second inner wall are disposed opposite to each other. This disposing method not only helps block the first connection hole 113 and the second connection hole 114, but also can avoid intertwining between the first flexible circuit board 117 and the second flexible circuit board 118.

In the embodiments of the present disclosure, the light sensing direction of the light sensing chip 120 may have multiple angles relative to penetrating directions of the first light capturing hole 111 and the second light capturing hole 112. As shown in FIG. 3 and FIG. 4, the penetrating directions of the first light capturing hole 111 and the second light capturing hole 112 may be perpendicular to the light sensing direction of the light sensing chip 120.

In the embodiments of the present disclosure, the light sensing chip 120 may be disposed in the cavity of the module housing 110 in a variety of ways. In an optional solution, the module housing 110 may include a bonding edge 1110 disposed on an inner wall of the module housing 110, the photographing module 100 may further include a circuit board 119, the light sensing chip 120 may be fixed on the circuit board 119, and the edge of the circuit board 119 may be fixedly bonded onto the bonding edge 1110, Specifically, the circuit board 119 may be fixed onto the bonding edge 1110 through bonding.

Based on the photographing module 100 disclosed in the embodiments of the present disclosure, the embodiments of the present disclosure disclose a terminal device. The disclosed terminal device includes a device housing 200, a driving structure, and the photographing module 100 described in the foregoing embodiments. The driving structure is connected to the photographing module 100, the device housing 200 is provided with a via hole 211, the driving structure is connected to the photographing module 100, and the driving structure drives the photographing module 100 to extend out of the device housing 200 or retract into the device housing 200 through the via hole 211.

Generally, the device housing 200 includes a middle frame 210, and the via hole 211 may be provided on the middle frame 210. Certainly, the via hole 211 may also be provided in other positions of the device housing 200, The embodiments of the present disclosure do not limit the specific providing position of the via hole 211.

The terminal device disclosed in the embodiments of the present disclosure may be a smart phone, a tablet computer, an e-book reader, a wearable device (such as a smart watch), or the like. The embodiments of the present disclosure do not limit a specific type of the terminal device.

The above embodiments of the present disclosure mainly describe the differences between various embodiments. As long as the different optimization features of the various embodiments are not contradictory, the various embodiments can be combined to form a better embodiment, Considering the brevity of the text, details are not described herein again.

The foregoing descriptions are merely embodiments of this disclosure, but are not intended to limit this disclosure. For a person skilled in the art, the present disclosure may have various changes and variations. Any modification, equivalent replacement, or improvement made without departing from the spirit and principle of this disclosure shall fall within the scope of claims of this disclosure,

What is claimed is:

1. A photographing module, comprising: a module housing, and a light sensing chip and a light capturing apparatus that are disposed in a cavity of the module housing, wherein a first light capturing hole and a second light capturing hole are provided on two opposite sides of the module housing, the light capturing apparatus is disposed opposite to each of the first light capturing hole and the second light capturing hole, in a first photographing state, ambient light passing through the second light capturing hole is projected onto the light sensing chip through the light capturing apparatus, and in a second photographing state, ambient light passing through the first light capturing hole is projected onto the light sensing chip through the light capturing apparatus;

wherein the photographing module further comprises a first electrochromic component, a second electrochromic component, and a controller, wherein the first electrochromic component covers the first light capturing hole, the second electrochromic component covers the second light capturing hole, the controller is connected to the first electrochromic component and the second electrochromic component, and the controller controls currents of the first electrochromic component and the second electrochromic component to control the first electrochromic component and the second electrochromic component to transmit light or block light;

wherein the module housing comprises a first surface and a second surface that are distributed opposite to each other, the first light capturing hole is provided on the first surface, the second light capturing hole is provided on the second surface, the first electrochromic component covers the first surface, and the second electrochromic component covers the second surface;

wherein a first connection hole connected to the cavity of the module housing is provided on the first surface, a second connection hole connected to the cavity of the module housing is provided on the second surface, a first electrical connection portion electrically connected to the first electrochromic component is disposed in the first connection hole, a second electrical connection portion electrically connected to the second electrochromic component is disposed in the second connection hole, and the first electrical connection portion and the second electrical connection portion are electrically connected to a circuit board in a device housing of the terminal device through a flexible electrical connection component passing through the module housing.

2. The photographing module according to claim 1, wherein the light capturing apparatus comprises a first light capturing component and a second light capturing component, the first light capturing hole and the second light capturing hole are disposed opposite to the first light capturing component and the second light capturing component respectively, in the first photographing state, the ambient light passing through the second light capturing hole is projected onto the light sensing chip through the second light capturing component, and in the second photographing state, the ambient light passing through the first light capturing hole is projected onto the light sensing chip through the first light capturing component.

3. The photographing module according to claim 2, wherein the first light capturing component and the second light capturing component are both reflecting prisms.

4. The photographing module according to claim 1, further comprising a lens component, wherein the lens component is disposed in the cavity, and the ambient light passing through the light capturing apparatus passes through the lens component and is projected onto the light sensing chip.

5. The photographing module according to claim 1, wherein the first electrochromic component and the second electrochromic component are both electrochromic glass plates.

6. The photographing module according to claim 1, wherein the first electrical connection portion and the second electrical connection portion are both silver paste portions.

7. The photographing module according to claim 6, wherein the flexible electrical connection component comprises a first flexible circuit board and a second flexible circuit board;
one end of the first flexible circuit board is electrically connected to the first electrical connection portion, and the other end of the first flexible circuit board passes through the module housing and is electrically connected to the circuit board; and
one end of the second flexible circuit board is electrically connected to the second electrical connection portion, and the other end of the second flexible circuit board passes through the module housing and is electrically connected to the circuit board.

8. The photographing module according to claim 7, wherein the first flexible circuit board is attached onto a first inner wall of the module housing and covers the first electrical connection portion, the second flexible circuit board is attached to a second inner wall of the module housing and covers the second electrical connection portion, and the first inner wall and the second inner wall are disposed relative to each other.

9. The photographing module according to claim 1, wherein the module housing comprises a bonding edge disposed on an inner wall of the module housing, the photographing module further comprises a circuit board, the light sensing chip is fixed on the circuit board, and the edge of the circuit board is fixedly bonded onto the bonding edge.

10. The photographing module according to claim 1, wherein a light sensing surface of the light sensing chip is covered by a light filter.

11. A terminal device, comprising a device housing, a driving structure, and a photographing module, wherein the driving structure is connected to the photographing module, the device housing is provided with a via hole, and the driving structure drives the photographing module to extend out of the device housing or retract into the device housing through the via hole, wherein the photographing module comprises:
a module housing, and a light sensing chip and a light capturing apparatus that are disposed in a cavity of the module housing, wherein a first light capturing hole and a second light capturing hole are provided on two opposite sides of the module housing, the light capturing apparatus is disposed opposite to each of the first light capturing hole and the second light capturing hole, in a first photographing state, ambient light passing through the second light capturing hole is projected onto the light sensing chip through the light capturing apparatus, and in a second photographing state, ambient light passing through the first light capturing hole is projected onto the light sensing chip through the light capturing apparatus;
wherein the photographing module further comprises a first electrochromic component, a second electrochromic component, and a controller, wherein the first electrochromic component covers the first light capturing hole, the second electrochromic component covers the second light capturing hole, the controller is connected to the first electrochromic component and the second electrochromic component, and the controller controls currents of the first electrochromic component and the second electrochromic component to control the first electrochromic component and the second electrochromic component to transmit light or block light;
wherein the module housing comprises a first surface and a second surface that are distributed opposite to each other, the first light capturing hole is provided on the first surface, the second light capturing hole is provided on the second surface, the first electrochromic component covers the first surface, and the second electrochromic component covers the second surface;
wherein a first connection hole connected to the cavity of the module housing is provided on the first surface, a second connection hole connected to the cavity of the module housing is provided on the second surface, a first electrical connection portion electrically connected to the first electrochromic component is disposed in the first connection hole, a second electrical connection portion electrically connected to the second electrochromic component is disposed in the second connection hole, and the first electrical connection portion and the second electrical connection portion are electrically connected to a circuit board in a device housing of the terminal device through a flexible electrical connection component passing through the module housing.

12. The terminal device according to claim 11, wherein the light capturing apparatus comprises a first light capturing component and a second light capturing component, the first light capturing hole and the second light capturing hole are disposed opposite to the first light capturing component and the second light capturing component respectively, in the first photographing state, the ambient light passing through the second light capturing hole is projected onto the light sensing chip through the second light capturing component, and in the second photographing state, the ambient light passing through the first light capturing hole is projected onto the light sensing chip through the first light capturing component.

13. The terminal device according to claim 12, wherein the first light capturing component and the second light capturing component are both reflecting prisms.

14. The terminal device according to claim 11, the photographing module further comprises a lens component, wherein the lens component is disposed in the cavity, and the ambient light passing through the light capturing apparatus passes through the lens component and is projected onto the light sensing chip.

15. The terminal device according to claim 11, wherein the module housing comprises a bonding edge disposed on an inner wall of the module housing, the photographing module further comprises a circuit board, the light sensing chip is fixed on the circuit board, and the edge of the circuit board is fixedly bonded onto the bonding edge.

16. The terminal device according to claim 11, wherein a light sensing surface of the light sensing chip is covered by a light filter.

17. The terminal device according to claim 11, wherein the first electrochromic component and the second electrochromic component are both electrochromic glass plates.

18. The terminal device according to claim 11, wherein the first electrical connection portion and the second electrical connection portion are both silver paste portions.

19. The terminal device according to claim 18, wherein the flexible electrical connection component comprises a first flexible circuit board and a second flexible circuit board;

one end of the first flexible circuit board is electrically connected to the first electrical connection portion, and the other end of the first flexible circuit board passes through the module housing and is electrically connected to the circuit board; and one end of the second flexible circuit board is electrically connected to the second electrical connection portion, and the other end of the second flexible circuit board passes through the module housing and is electrically connected to the circuit board.

20. The terminal device according to claim 19, wherein the first flexible circuit board is attached onto a first inner wall of the module housing and covers the first electrical connection portion, the second flexible circuit board is attached to a second inner wall of the module housing and covers the second electrical connection portion, and the first inner wall and the second inner wall are disposed relative to each other.

\* \* \* \* \*